United States Patent
Mueller

(10) Patent No.: US 11,832,757 B2
(45) Date of Patent: Dec. 5, 2023

(54) BEVERAGE PREPARATION DEVICE WITH A MILK SYSTEM

(71) Applicant: Franke Kaffeemaschinen AG, Aarburg (CH)

(72) Inventor: Simon Mueller, Muhen (CH)

(73) Assignee: Franke Kaffeemaschinen AG, Aarburg (CH)

( * ) Notice: Subject to any disclaimer, the term of this patent is extended or adjusted under 35 U.S.C. 154(b) by 610 days.

(21) Appl. No.: 17/002,905

(22) Filed: Aug. 26, 2020

(65) Prior Publication Data

US 2021/0059466 A1   Mar. 4, 2021

(30) Foreign Application Priority Data

Sep. 3, 2019 (DE) .......................... 102019123590.1

(51) Int. Cl.
*A47J 31/44* (2006.01)
*A47J 31/46* (2006.01)

(52) U.S. Cl.
CPC ......... *A47J 31/4485* (2013.01); *A47J 31/461* (2018.08); *A47J 31/465* (2013.01); *A47J 31/468* (2018.08); *A23C 2210/30* (2013.01)

(58) Field of Classification Search
CPC .... A47J 31/4485; A47J 31/461; A47J 31/468; A47J 31/465; A23C 2210/30
USPC .......... 99/275, 280, 281, 288, 290, 295, 279
See application file for complete search history.

(56) References Cited

U.S. PATENT DOCUMENTS

| | | | |
|---|---|---|---|
| 3,983,257 A * | 9/1976 | Malmberg | A23C 9/1508 426/491 |
| 5,207,148 A | 5/1993 | Anderson et al. | |
| 8,795,752 B2 | 8/2014 | Kindler et al. | |
| 2012/0121769 A1* | 5/2012 | Castellani | C02F 1/484 426/237 |
| 2013/0101718 A1* | 4/2013 | Kindler | A47J 31/4485 99/453 |

FOREIGN PATENT DOCUMENTS

| | | |
|---|---|---|
| CN | 101253393 A | 8/2008 |
| CN | 205373831 U | 7/2016 |
| CN | 205593619 U | 9/2016 |
| CN | 106044683 A | 10/2016 |
| CN | 107836998 A | 3/2018 |

(Continued)

OTHER PUBLICATIONS

Chinese Office Action dated Jan. 19, 2022 for Chinese Patent Application No. 202010911227.7.

(Continued)

*Primary Examiner* — Phuong T Nguyen
(74) *Attorney, Agent, or Firm* — Volpe Koenig

(57) ABSTRACT

A beverage preparation device, in particular for preparing coffee, tea or milk beverages, having a milk system for dispensing milk and/or milk froth, and having a control unit for controlling the beverage preparation device to dispense beverages portion by portion. The milk system here has a connectable conveying line to a milk container, and a milk pump which is attached to the conveying line. A first mechanical flow meter is arranged in the conveying line, this flow meter meters the volume of milk conveyed by the milk pump and is connected in terms of signaling to the control unit.

9 Claims, 1 Drawing Sheet

(56) References Cited

FOREIGN PATENT DOCUMENTS

| DE | 69122012 | 4/1997 |
| DE | 102011084901 | 4/2013 |
| DE | 102016222812 | 5/2018 |
| DE | 102017123642 | 4/2019 |
| DE | 102017217953 | 4/2019 |
| EP | 2583596 A1 | 4/2013 |
| EP | 3323326 A1 | 5/2018 |
| WO | 2019/072583 A1 | 4/2019 |

OTHER PUBLICATIONS

Chinese Office Action dated Jun. 6, 2022 for Chinese Patent Application No. 202010911227.7.

European Search Report dated Oct. 27, 2020 for European Patent Application No. 20192192.1.

Tang Jie et al., "Inexpensive Sensor Technology and Applications", Institute of Science and Technology Information, Shanghai Municipal Bureau of Instrumentation and Telecommunications, (Aug. 31, 1985).

\* cited by examiner

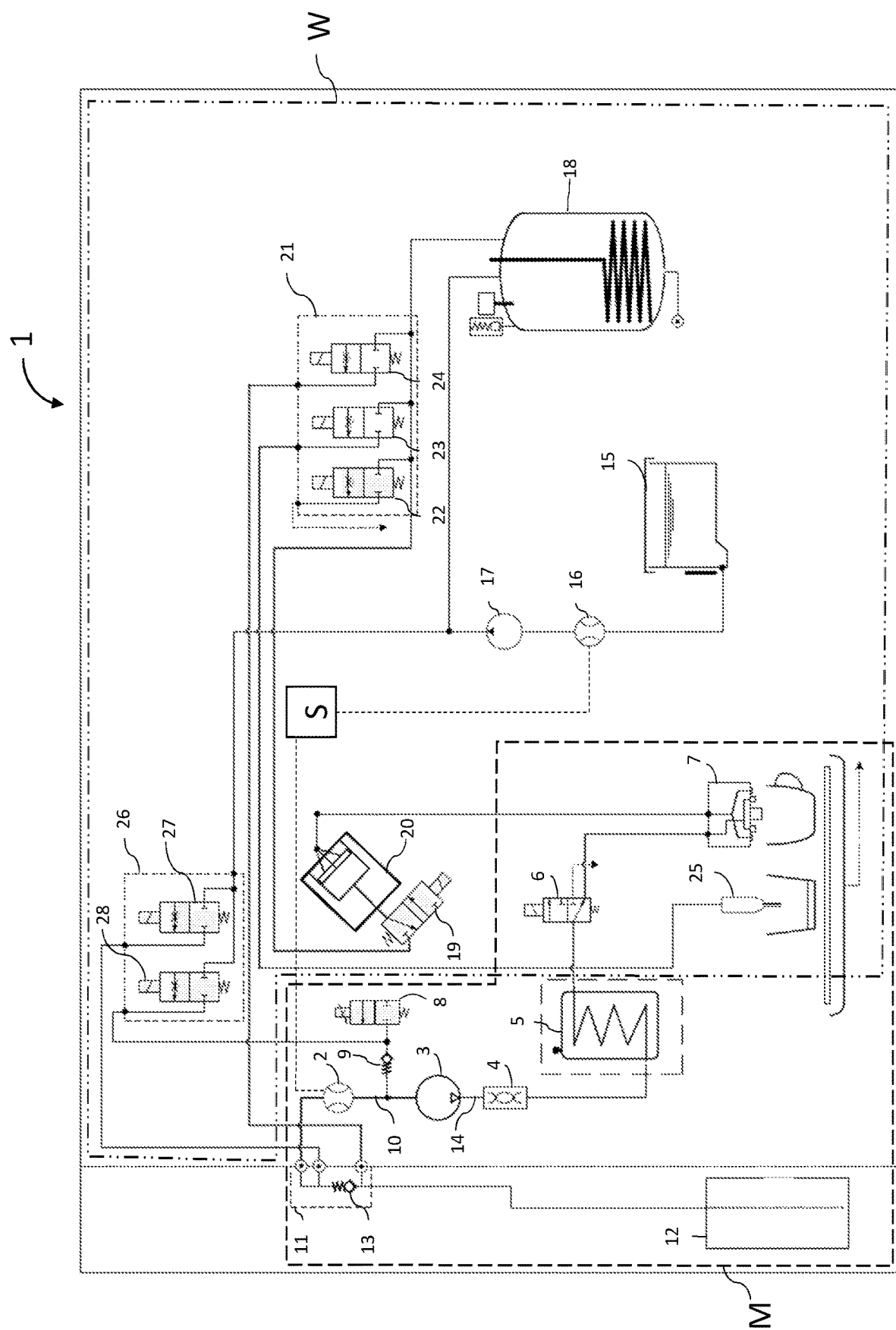

BEVERAGE PREPARATION DEVICE WITH A MILK SYSTEM

INCORPORATION BY REFERENCE

The following documents are incorporated herein by reference as if fully set forth: German Patent Application No. 10 2019 123 590.1, filed Sep. 3, 2019.

TECHNICAL FIELD

The invention relates to a beverage preparation device, in particular for preparing coffee, tea or milk beverages, having a milk system for dispensing milk and/or milk froth, and having a control unit for controlling the beverage preparation device to dispense beverages portion by portion, the milk system having a conveying line, which is connectable to a milk container, and a milk pump, which is attached to the conveying line.

Furthermore, the invention relates to a method for preparing a beverage, in particular coffee, tea or milk beverage, in which beverages are dispensed portion by portion into a drinking vessel and milk and/or milk froth is added to the beverage by milk being conveyed from a milk container via a conveying line in the direction of a beverage outlet.

BACKGROUND

Beverage preparation devices for automatically preparing and dispensing coffee beverages, what are referred to as fully automatic coffee machines, are known from the prior art. They generally have a milk system with which milk can be conveyed from a milk container and added as milk or milk froth to the freshly prepared beverages. In order to ensure a consistent quality of the prepared beverage, the dispensed quantity of milk each time it is dispensed has to be metered in accordance with a nominal quantity according to a formula. This is achieved in known beverage preparation devices in that a milk pump for conveying the milk in the milk system is switched on for a constant period of time, during which a defined milk volume is conveyed. However, the metering of the quantity of milk via the pump conveying time is imprecise and subject to various external influences. The pump power can depend on the viscosity and thus on the type of milk used. In addition, as the operating time increases, the efficiency of the milk pump may change, and therefore the quantity of milk conveyed over a constant switching-on time may change over time. Finally, during the preparation and dispensing of milk froth, air can be supplied on the suction side of the milk pump. The frothing here in turn has a great influence on the quantity of milk conveyed per unit of time and depends not only on the type of milk but also on the milk temperature, the pressure in the pump and the supplied quantity of air.

SUMMARY

The invention is therefore based on the object of specifying a beverage preparation device and a corresponding method, which permit a more precise portioning of the quantity of milk conveyed.

The object is achieved in respect of the beverage preparation device and a method having one or more features of the invention. Advantageous refinements are described below and in the claims.

According to the invention, a beverage preparation device of the type mentioned at the beginning is provided with a flow meter, in particular a mechanical flow meter, which is arranged in the conveying line of a milk system and detects the conveyed volume of milk as soon as the milk flows through it. The flow meter outputs its measurement signals to a control unit with which the metering of the conveyed volume of milk is controlled.

According to the invention, the beverage preparation device serves for preparing beverages in which milk is used either as an addition or as a main constituent of a beverage. The term milk is not limited here only to the milk of cows or other domesticated animals, but rather also includes non-animal milk alternatives, such as oat milk, rice milk, soya milk, almond milk or other milk-type liquids.

The milk system serves for dispensing the milk and/or milk froth during the preparation of beverages. For this purpose, in addition to fluid lines, the milk system also comprises components which can be controlled and/or regulated and which permit the conveying, treating and metering of milk.

A milk-conducting conveying line is connectable to a milk container via a port of the beverage preparation device. The releasable connection between conveying line and milk container can be realized by a sealing closure and also by a screw cap, bayonet catch or click closure in the attachment module, or else by non-sealing, fluid-conducting connections, such as, for example, a milk lance which is inserted or submerged into a milk container. In addition, the port can be provided with valve components which prevent a return flow of milk into the milk container, for example when the conveying pressure collapses after the milk pump is switched off.

A milk pump serves for conveying milk out of the milk container by a conveying line and for dispensing milk by a dispensing line. Furthermore, the milk pump can be designed in such a manner that milk froth is, inter alia, produced by it or the production of milk froth is assisted by the pump. In this context, the term pump is not limited to the conveying of incompressible or virtually incompressible media, such as milk, but rather, by the use of preferred pump designs, such as gear pumps, can be used to treat the milk. In principle, the milk pump can be in the form of a flow pump, positive displacement pump or else a jet pump.

The flow meter arranged in the conveying line serves for determining the flow volume of milk in the conveying line. This relates to the flow at a particular instant but also to the entire volume of milk for the period of one or more operations to dispense milk or milk froth. The flow meter can be understood as being a measuring sensor which is operatively connected to a measuring transducer, but may be formed together with or separately from the latter. The measuring transducer can be connected in terms of energy to a control unit or can have an independent energy supply. Furthermore, a signaling communication between measuring transducer and the control unit can take place in wired or wireless form.

The flow meter detects a flow volume in the conveying line by the total volume or a partial volume of the milk flow, with respect to the cross section of the conveying line, entirely or partially flowing through the measuring sensor of the flow meter. The flow quantity is indirectly determined by the flow influencing at least one operating parameter of the measuring sensor in such a manner that said operating parameter can be assigned to a volume. Operating parameters here are in particular mechanical characteristic variables, such as rotational speed/rotational acceleration of one or more rotating components or else the speed/acceleration of one or more linearly moving components of the flow meter. The mechanical characteristic variable is detected by the measuring transducer and converted into one or more electric signals, by means of which the assignment between above-mentioned operating parameter and a volume takes place.

The measuring transducer can comprise components and functions with which the signal of the measuring transducer can be additionally amplified or processed before it is communicated to a control unit. The processing here can be a pre-processing step for the control unit by the signal being filtered in analog or digital form in order to increase the measuring accuracy. However, the processing may also include individual steps or all of the steps for calculating a volume per unit of time or time interval. The measured signals can be placed into a ratio with a unit of time or time interval and can thus represent a volumetric flow. The assignment of the signals per unit of time to a corresponding volumetric flow can already be undertaken by the manufacture of the flow meter or during operation within the scope of adjustment operations by reference measurements. These will be explained in more detail in the further course of the description.

The signals are communicated from the first flow meter to the control unit which controls the operation of the beverage preparation device. The control unit is an electrically acting signal processing unit which receives and/or outputs signals, with reference to which dispensing of beverages portion by portion takes place. Incoming signals may be voltages or currents which are output by the flow meter, by other sensors or by further secondary control units. The outputting of signals by the control unit make it possible to regulate the currents of a motor, with which the milk pump is driven and/or fluid-controlling components of the milk system are actuated, said components influencing the conveying of the milk flow or interrupting the dispensing thereof. The control unit may also be designed as a monitoring unit which, in addition to pure control, also enables regulation of the milk flow. The regulation can be undertaken here with various regulating parameters or cycles permitting both a dynamic flow regulation and an adaptable metering of milk or milk froth from dispensing operation to dispensing operation.

In a preferred refinement of the device, the latter has a water conveying system with which water for preparing beverages can be conveyed directly from a tap, a water tank or from other reservoirs. A second flow meter with which the volume of the conveyed water can be measured is situated in the water conveying system. The measurement is undertaken here analogously to the statement regarding the first flow meter. However, the types of the first and the second flow meter that are used may differ in their embodiments. In particular, this can be the case if the flow quantities in the conveying line of the milk system and in a line of the water conveying system differ in such a manner that flow meters for different nominal throughputs have to be individually dimensioned. In addition, the flow meters can be exposed to pressures of differing magnitudes, requiring the components to be of a corresponding strength. The costs of the flow meters may also be a selection criterion for the selection thereof.

In one refinement, the beverage dispensing device can carry out a flushing operation with which a water flow can flow through the lines of the beverage dispensing device. For this purpose, a first flushing valve in the water conveying system connecting the water conveying system to the milk system is activated. As a result, the first and the second flow meter are hydraulically connected in series. This means that, during a flushing operation, water is conveyed both through the milk system and through the water conveying system and the same water flow flows through both the first and second flow meters. Milk or milk residues can thereby be removed from parts of the device with which they were previously in contact.

Investigations by the applicant have shown that, as the operating duration of the flow meter increases, the measurement of milk flows has measurement deviations which may be expressed in particular in the form of systematic deviations. In order to counteract this problem, the inventors have surprisingly succeeded in compensating for such measurement deviations without having to change the design or the manner of operation of the first flow meter. Sustainably high measurement accuracy of the first flow meter is achieved here by the flushing operation of the beverage preparation device being used for a measuring adjustment, in which measurement deviations can be compensated for. During the flushing operation, the required quantity of water here is measured both by the first and the second flow meter as a result of the hydraulic series connection. The gathered measurement values of the two flow meters here are communicated to the control unit which uses the measurement values in order to carry out a measuring adjustment of the first flow meter with the measurement values of the second flow meter. The second flow meter acts here as a reference measuring device and the first flow meter as the measuring system which is compared with the measurement values of the reference measuring device.

The adjustment is based on the inventors' finding that the measurement values of the second flow meter have been subject to negligibly small deviations in comparison to the first flow meter over the operating time of the beverage preparation device while the measurement behavior of the first flow meter changes over time. A possible reason for this is that the second flow meter primarily comes into contact with water and therefore, in contrast to the first flow meter, which primarily comes into contact with milk, has to be cleaned less frequently and with less aggressive agents. By contrast, the change in the measurement behavior of the first flow meter may have its cause in microscopic adhesions of constituents of milk or milk cleaning agents that have an influence on the smooth running of movable parts of the flow meter. In addition, for the preparation of beverages, milk and water are not necessarily conveyed in the same volumes, and therefore the flow meters can optionally be dimensioned for different throughputs. The service lives of the components thus differ in association with correspondingly different wear phenomena. The latter may additionally occur prematurely by the conveying of milk.

If the second flow meter measures one or more quantities of water during the flushing operation, the electric signals of the first flow meter, which measures the same quantity of water, are assigned to a known flow volume and this assignment is used for the further measuring operation during the metering. In the simplest use form, a linear correlation between a number of measurement signal pulses and a conveyed volume can be established for the first flow meter. A first number of signal pulses that is equal to zero and a first volume equal to zero here can together represent a point on a straight line in a suitable system of coordinates. A second point can be formed by a second number of signal pulses not equal to zero and a second volume, determined by the second flow sensor, which is not equal to zero. If a plurality of measurements of in each case different volumes are carried out, the relationships may not only be linear, but also polynomial or can be depicted by a plurality of functional equations or numerical relationships.

The adjustment makes it possible to compensate for measurement uncertainties in the volumetric measurement of milk that are caused by the measurement inaccuracy of the first flow meter, and the absolute accuracy and/or the repetition accuracy can be increased. During a flushing operation, individual flows of different volumes can also be conveyed and measured, as a result of which it is possible to establish linearity deviations of the first flow meter.

In a further preferred refinement of the invention, the first flow meter is a turbine wheel flow meter. The manner of operation of the turbine wheel flow meter is based on an axial incident flow on a turbine wheel by means of the fluid to be measured, during which said turbine wheel is set into a rotational movement. As the flow velocity increases, the rotational speed of the turbine wheel increases. By the use of a known ratio of rotational speed to flow velocity, the flow volume can be determined by the movement of the turbine wheel being detected by the measuring transducer. A positive or negative gearing of the velocity can be used to increase the resolution of the measurement system. The inventors have surprisingly found that, in contrast to other flow meters, in particular to the most frequently used impellor meters, a turbine wheel flow meter in contact with milk and/or milk cleaning agents exhibits only a very small change in its measurement behavior over the operating period of the beverage preparation device, which makes said turbine wheel flow meter particularly suitable for use in the milk system.

By contrast, in a preferred embodiment, a conventional impellor flow meter is used as the second flow meter. The manner of operation of the impellor flow meter is based on a radial incident flow on an impellor which is set into a rotational movement. The flow quantity is detected analogously to the statements regarding the turbine wheel meter. In terms of design and cost, the impellor flow sensor is particularly suitable for measuring volumes of water.

In a further preferred refinement, the device is designed for the attachment of a Bag-in-Box milk container. A Bag-in-Box milk container is a receptacle in which an internal bag is located in an external pack and is supported by the latter. The advantage of the use of Bag-in-Box milk containers relates to hygiene aspects by the possible exchange of containers in cases in which milk has become rancid. The use of disposable Bag-In-Box milk containers may also be advantageous since containers of this type do not have to be cleaned and possibly unsatisfactory cleaning therefore also cannot have an effect on the beverage quality.

In the case of a Bag-in-Box milk container, the milk is stored without air, and therefore the milk remains fresh for longer. There is no flow of air for the removed milk; instead, the flexible internal bag slowly collapses. A further aspect of the present invention relates here to what is referred to as the empty signaling sensor, i.e. the sensor which signals to the controller that the milk container is empty and no more milk can be conveyed. In the case of conventional beverage vending machines, said empty signaling sensor is realized by a light barrier which detects sucked-up air bubbles instead of the dwindling milk. However, such a light barrier would not function in the case of a Bag-in-Box milk container since no air can flow in and, even if a milk container is empty, i.e. if the milk pump generates a negative pressure in the milk container, milk residues can still be located in the conveying line.

The present invention provides a remedy for this by, instead of a light barrier, the flow meter according to the invention also being used in an additional function as an empty signaling sensor. In contrast to light barriers, the flow meter according to its operating principle outputs measurement signals which not only represent the presence, but also the flow velocity of the volume of milk. An unmoving volume of milk with the velocity near to or equal to zero can consequently be identified by said flow meter and assigned to an empty state since a lack of current does not actuate the measuring transducer. If, the milk pump is switched on and no volumetric flow is detected by the first flow meter, it can thus be concluded that the milk container is empty and a corresponding empty signaling signal can be generated in the controller. The empty state can then be signaled to the operator by the beverage preparation device.

In a further preferred refinement of the device, an air supply line is located on the suction side of the milk pump and opens into the conveying line. This air supply line can be used for generating milk froth. The air supply line can be provided with a valve device which is activated before or during the conveying of milk in order to let air into the milk system. In addition, the air supply line can serve solely or in operative connection with other components, such as pressure increasing elements, mixers or the milk pump, for forming milk froth. Pressure increasing elements can be embodied in the form of throttles or as part of mixing components, such as helical mixers. Particular pump designs, such as gear pumps, additionally promote the formation of froth. The quantity of air can be regulated by a clocked opening and closing of a valve device by the pulse duty factor, i.e. the ratio of the opening time per clock cycle, being changed. The air supply can also be controlled via the pressure or the flow velocity in the milk system and air can accordingly be brought into the conveying line as a result of a positive and/or negative pressure.

In a further advantageous refinement of the device, a drainage valve for discharging milk is connected on the delivery side of the milk pump to a beverage outlet via a dispensing line. In order to carry out a flushing operation, flushing water and optionally milk or milk froth residues can be conducted into a drain via said drainage valve. The drainage valve can serve together with a flushing operation in order to improve the hygiene in the preparation of beverages. The flushing operation can be carried out when required using the drainage valve, for example after a long-lasting shutdown of the beverage preparation device or after using cleaning agents in the water and/or milk system, which cleaning agents have to be flushed out before the preparation of beverages. The drainage valve can also be used for discharging liquid residues following the preparation, or before transportation of the beverage preparation device.

In the case of the method according to the invention for preparing coffee, tea or milk beverages, beverages are dispensed portion by portion into a drinking vessel and milk and/or milk froth is added to the beverage by milk being conveyed from a milk container via a conveying line in the direction of a beverage outlet. According to the invention, it is provided here that the volume of milk conveyed via the conveying line is determined with the aid of a flow meter for the metering of the dispensed quantity of milk.

For the preparation of beverages, fresh water and/or hot water can additionally be conveyed via a water conveying system in the direction of the beverage outlet, for example for preparing freshly brewed coffee. A second flow meter which is provided in the water conveying system serves here for determining the volume of the conveyed water. In a preferred development of the method, the water conveying system is connected to the milk system for subsequently carrying out a flushing operation via a flushing valve. The first and these second flow meter are connected here hydraulically in series. Within the scope of said flushing operation, according to the invention an adjustment of the first flow meter to measurement values of the second flow meter is carried out.

BRIEF DESCRIPTION OF THE DRAWINGS

An exemplary embodiment of the invention will be explained in more detail below with reference to the drawing.

The single FIGURE shows a water flow diagram of a beverage preparation device.

DETAILED DESCRIPTION

The water flow diagram illustrated in the FIGURE has a milk system M of a beverage preparation device 1, the milk system having a flow meter 2, a milk pump 3, a pressure increasing element 4, a temperature control unit for milk or milk froth 5, a drainage valve 6, a beverage outlet 7 and an air valve 8. The air valve 8 is connected to the conveying line 10 via a nonreturn valve 9. The conveying line 10 connects the suction-side components of the milk system M to one another. It is connected to a port 11 at which a milk container 12 is attached to the milk system M. A port nonreturn valve 13 is located at the port 11. The dispensing line 14 is connected to the milk pump 3 on the delivery side and forms a fluid-conducting connection of the components arranged there of the milk system M.

During the preparation of milk-containing beverages, the milk pump 3 conveys milk out of the milk container 12 via the conveying line 10 and the port 11. The milk flows here through the flow meter 2 and through the milk pump 3. A drive unit which drives the milk pump 3 is not illustrated as such and should be regarded, in the exemplary embodiment illustrated, as part of the milk pump 3.

The flow meter 2 is designed as a turbine flow meter and is connected in terms of signaling to a control unit S. The flow meter 2 serves to determine the required volume of milk and thus to control the dispensing of the quantity of milk predetermined or desired in each case for a selected beverage.

On the suction side of the milk pump 3, the air valve 8 is connected to the conveying line 10 via a nonreturn valve 9. The milk or the milk and air mixture is conveyed by the milk pump 3. By introducing air into the suction line, a milk froth is produced in the milk pump 3 from the sucked-up milk and air mixture. The applicant has found that the frothing of the milk and air mixture in the milk pump 3 functions best if a gear pump is used as the milk pump 3. In addition, an increased pressure is necessary in the milk pump 3 in order to generate froth. For this purpose, use is made of the pressure increasing element 4 which is attached to the pump of the delivery side. This pressure increasing element can be designed as a flow resistor in the form of a throttle but also as a mixer, in particular as a helical mixer.

A temperature control unit 5—for example a continuous flow heater or thermal block—for milk and/or milk froth is optionally arranged in the milk system. Said temperature control unit can be based on various operating principles and can bring the temperature of the milk or of the milk froth to a nominal temperature or a temperature range depending on the type of preparation. Possible embodiments here include heat exchangers with active heating/cooling elements or passive heating/cooling elements which optionally utilize the operating temperature of other components of the beverage preparation device.

The drainage valve 6 is designed as a 3/2-way valve, the output connections of which are connected to a drain and to the beverage outlet 7. For the dispensing of milk or milk froth, the drainage valve 6 is in a position which opens up a flow path to the beverage outlet 7. An alternative switching position of the drainage valve 6 connects the dispensing line 14 to the drain. As a result, milk residues or milk froth residues can be removed from the milk conveying system M.

The milk container 12 serves for storing milk and is designed as a Bag-In-Box milk container. The latter consists of a milk bag which is supported by a housing, for example a carton or a frame. The Bag-In-Box milk container 12 is connected to the conveying line 10 via the port 11. The nonreturn valve 13 and the port 11 prevents milk from flowing back into the Bag-In-Box milk container and releases the milk flow in the conveying direction.

Due to the design of the milk container 12 as a Bag-In-Box milk container, as milk is increasingly removed, the milk bag contracts as a result of the negative pressure which is generated by the milk pump 3. If the milk pump 3 continues to be operated when the Bag-In-Box milk container is empty, the Bag-In-Box milk container and the conveying line 10 are compressed to an extent permitted by the rigidity of this part of the milk system, but no volumetric flow, or virtually no volumetric flow, through the conveying line 10 takes place. In this case, the flow meter 2 accordingly does not detect a volumetric flow and outputs this signal to the control unit S. If the control unit S additionally recognizes that the milk pump 3 is switched on and, according to the signal of the flow meter 2, no volumetric flow, or virtually no volumetric flow, is taking place, the control unit S can output a signal which can be interpreted by an operator to mean that the Bag-In-Box milk container should be exchanged or should optionally be topped up. The flow meter 2 thus serves in an additional function as an empty signaling sensor.

Besides the milk system M, the water flow diagram shown in the FIGURE has a water conveying system W. The latter comprises a water tank 15, a flow meter 16, a water pump 17 and a temperature control unit 18 in the form of a water boiler.

The control unit S is connected in terms of signaling to the flow meter 16 and can be regarded as a common electrical component both of the milk system M and of the water conveying system W. The temperature control unit 18 is connected to a brewing valve 19 which, in turn, is connected to a brewing chamber 20. A dispensing line leads from there to the outlet 7.

Furthermore, the temperature control unit 18 is connected to a first valve group 21 which comprises a valve for letting out water 22, a valve 23 for dispensing water and a valve 24 for cleaning purposes. The valve 23 is connected to a water outlet 25. The valve 24 leads to the port 11 of the milk system M. The water pump 17 is connected to a second valve group 26 which comprises a first flushing valve 27 and a second flushing valve 28. The first flushing valve 27 connects the water conveying system W to the conveying line 10 and opens on the input side to the flow meter 2 into the milk system M. The water conveying system W can be connected to the nonreturn valve 9 and the to the air valve 8 via the second flushing valve 28.

During the operation of the beverage preparation device, the water pump 17 conveys water out of the water tank 15. The water pump 17 can differ in its embodiment from the milk pump 3. The difference may arise because of the different requirements made of the two pumps: while the water pump for producing beverages, such as espresso, has to apply pressures of up to 12 bar, the conveying of milk and milk froth only requires pressures of up to 4 bar. This results in different requirements of the components of the pumps. Furthermore, the pumps are optionally configured to different conveying quantities, and on account thereof the water pump 7 can be configured to be larger or smaller than the milk pump 3.

During the conveying of water out of the water tank 15, the conveyed water flows through the flow meter 16, which is designed as an impellor flow meter. The latter serves per se to measure the required volume of water for the dispensing of beverages, in order to convey the desired quantity of water or quantity of water provided for a selected beverage.

A fluid-conducting connection leads from the water pump 17 to the temperature control unit 18. The temperature control unit 18 is configured here as a boiler, and therefore a sufficiently large volume of water is already produced before the preparation of a beverage, in order to control the temperature of said volume of water and thus to make it available without a time delay for preparing the beverage. Analogous to the temperature control unit 5, the manner of operation of the temperature control unit 18 can be based on active or passive temperature control elements. The temperature control unit 18 can be activated by the control unit in order, upon being switched on or by a time switch, to initiate the conveying of water and a subsequent temperature control.

The preparation of a beverage can take place partially or entirely without addition of milk by a water flow being conveyed through the brewing valve 19 into the brewing chamber 20. For this purpose, the brewing valve is brought into a switching position in which the water flow can pass into the brewing chamber. The brewing chamber 20 is designed for the preparation as a container for tea, coffee or soluble tea/coffee granules, through which the flow can pass. The beverage is either dispensed via a beverage outlet 7 together with milk or milk froth, or else can be dispensed separately therefrom, on its own.

The valve group 21 is connected to the temperature control unit 18 in such a manner that the water flow from the temperature control unit 18 can be branched off for each of the valves 22, 23 and 24. During the preparation of coffee, if not required by the selected manner of preparation, the valves 22, 23 and 24 are in blocking switching positions. This is relevant in particular if coffee beverages, such as espresso, are prepared under an increased pressure. A spatial grouping of the elements as a valve block 21 is not absolutely necessary since the valves 22, 23, 24 do not have to be in a functional relationship with one another. The components are actuated via a communication in terms of signaling with the control unit S which brings about the switching of individual valves or all of the valves.

The connection of the valve 22 to an outlet permits water to be let out of a water tank or out of the temperature control unit, in particular for the purposes of transport or maintenance or repair. For this purpose, the valve 22 is brought into an opening position.

The connection of the valve 23 for dispensing water to a water outlet 25 permits the dispensing of temperature controlled water with which beverages, such as tea, can also be prepared manually. Furthermore, the valve 23 can be activated as part of the preparation of a coffee beverage. In this case, after coffee has finished being dispensed, hot water is issued into a drinking vessel.

Hot water can be conveyed to the port 11 of the milk container 12 via the valve 24. The hot water is used for carrying out a cleaning or flushing operation. The milk container 12 is replaced here by a cleaning container by the user. Hot water for cleaning the system can then be automatically metered into the cleaning container via the valve 24.

The water pump 17 is connected to the second valve group 26. According to the statements regarding the valve group 21, the valves of the second valve group 26 do not have to be grouped, but rather can be located at different spatial positions.

The flushing valve 27 connects the milk system M to the water conveying system W. The latter is used for a flushing operation in which some of the components of the milk system are flushed with cold water. If the flushing valve 27 is opened, the flow meter 2 is hydraulically connected in series with the flow meter 16. The same volume of water thus flows through the flow meter 2 as through the flow meter 16. A measuring adjustment of the two flow meters can thus be carried out during a flushing operation.

Within the scope of a measuring adjustment, the signals supplied by the flow meters 2 and 16 are in each case assigned by the controller S to a corresponding flow volume. This is undertaken with reference to values stored previously in the control unit S. If the volumes measured by the flow meters 2 and 16 differ, a correction factor is determined by which the volumes measured by the flow meter 2 are adjusted. For this purpose, said correction factor is stored and is used for the subsequent operation of the flow meter 2 in the dispensing and metering of milk or milk froth.

The flushing valve 28 permits the water conveying system to be connected to the milk system M. The line emerging from the valve 28 can be connected here to the milk system M in such a manner that a water flow can flow through the nonreturn valve 9.

The invention claimed is:
1. A beverage preparation device, comprising:
a milk system (M) for dispensing at least one of milk or milk froth,
a controller (S) configured to control the beverage preparation device to dispense beverages portion by portion,
the milk system (M) having a conveying line (10), which is connectable to a milk container (12), and a milk pump (3), which is attached to the conveying line (10),
a first flow meter (2) arranged in the conveying line (10), said flow meter for metering the milk volume conveyed by the milk pump (3) being connected in terms of signaling to the controller (S),
a water conveying system (W) for conveying at least one of fresh water or hot water for beverage preparation, and the water conveying system has a second flow meter (16) for determining a volume of water conveyed by the water conveying system,
for carrying out a flushing operation, the water conveying system is connectable to the milk system (M) via at least one first flushing valve (27) such that the first and the second flow meters (2, 16) are connected hydraulically in series, and
the controller (S) is configured to carry out, within the scope of a flushing operation, an adjustment of the first flow meter (2) to measurement values of the second flow meter (16).
2. The beverage preparation device as claimed in claim 1, in which the first flow meter (2) comprises a turbine wheel flow meter.

3. The beverage preparation device as claimed in claim 1, wherein the second flow meter (16) is an impellor flow meter.

4. The beverage preparation device as claimed in claim 1, wherein the conveying line (10) of the milk system (M) is configured for attachment of a bag-in-box milk container (12), and the first flow meter (2) is further configured as an empty signal sensor for the controller (S).

5. The beverage preparation device as claimed in claim 1, wherein, on a suction side of the milk pump (3), an air supply line opens into the conveying line, and the air supply line is connectable to the water conveying system (W) via a second flushing valve (28).

6. The beverage preparation device as claimed in claim 1, wherein the milk system (M) is connected on a delivery side of the milk pump (3) to a beverage outlet (7) via a dispensing line, and a drainage valve (6) is arranged in the dispensing line, via which drainage valve the dispensing line, for carrying out a flushing operation, is conducted into a drain.

7. The beverage preparation device as claimed in claim 1, wherein the beverage preparation device is configured to prepare coffee, tea or milk beverages.

8. The beverage preparation device as claimed in claim 1, wherein the first flow meter is a mechanical flow meter (2).

9. A method for preparing a beverage, comprising:
dispensing beverages portion by portion into a drinking vessel,
adding at least one of milk or milk froth to the beverage by milk being conveyed from a milk container (12) via a conveying line (10) in a direction of a beverage outlet,
metering a dispensed quantity of milk that is conveyed via the conveying line (10) using a first flow meter (2),
for the preparation of a beverage, conveying at least one of fresh water or hot water via a water conveying system (W) in a direction of the beverage outlet and a determining a volume of the conveyed water using a second flow meter (16),
for subsequently carrying out a flushing operation, connecting the water conveying system (W) to the milk system (M) via a flushing valve (27) such that the first and the second flow meter (2, 16) are hydraulically connected in series, and
during the flushing operation, carrying out an adjustment of the first flow meter (2) using measurement values of the second flow meter (16).

* * * * *